(12) United States Patent
Störmer et al.

(10) Patent No.: US 10,773,585 B2
(45) Date of Patent: Sep. 15, 2020

(54) DRIVE DEVICE FOR A MOTOR VEHICLE, CORRESPONDING MOTOR VEHICLE AND METHOD FOR OPERATING A DRIVE DEVICE

(71) Applicant: AUDI AG, Ingolstadt (DE)

(72) Inventors: Markus Störmer, Berching (DE); Christian Meixner, Ingolstadt (DE); Thomas Hoffmann, Riedenburg (DE); Frank Vollmer, Ingolstadt (DE); Tassilo Scholle, Ingolstadt (DE); Josef Winkler, Kipfenberg (DE); Alfred Ottowitz, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/778,774

(22) PCT Filed: Nov. 24, 2016

(86) PCT No.: PCT/EP2016/078679
§ 371 (c)(1),
(2) Date: May 24, 2018

(87) PCT Pub. No.: WO2017/093115
PCT Pub. Date: Jun. 8, 2017

(65) Prior Publication Data
US 2018/0345781 A1 Dec. 6, 2018

(30) Foreign Application Priority Data

Dec. 4, 2015 (DE) .................. 10 2015 015 696

(51) Int. Cl.
*B60K 6/48* (2007.10)
*B60K 6/387* (2007.10)
(Continued)

(52) U.S. Cl.
CPC .............. *B60K 6/387* (2013.01); *B60K 6/365* (2013.01); *B60K 6/445* (2013.01); *B60K 6/448* (2013.01);
(Continued)

(58) Field of Classification Search
CPC ...... B60K 6/387; B60K 6/445; B60K 17/356; B60K 6/52; B60K 6/365; B60K 6/448;
(Continued)

(56) References Cited

U.S. PATENT DOCUMENTS 5,669,842 A * 9/1997 Schmidt ................. B60K 17/28
475/5
6,953,409 B2 * 10/2005 Schmidt ................. B60K 6/387
475/5
(Continued)

FOREIGN PATENT DOCUMENTS

CN 103057395 A 4/2013
CN 104870231 A 8/2015
(Continued)

OTHER PUBLICATIONS

Search Report dated Sep. 9, 2016 of corresponding German Application No. 10 2015 015 696.9; 10 pgs.
(Continued)

*Primary Examiner* — David J Hlavka
(74) *Attorney, Agent, or Firm* — Maier & Maier, PLLC

(57) ABSTRACT

A drive device for a motor vehicle, with a first drive assembly, a second drive assembly, and a planetary gearing, via which the first drive assembly and the second drive assembly, which has a drivable axle of the motor vehicle, can be operatively connected. In this case, it is provided that the first drive assembly can be operatively connected to the planetary gearing via a first clutch coupling, and the drivable axle can be operatively connected to the planetary gearing
(Continued)

via a second clutch coupling, and the second drive assembly and an auxiliary assembly are permanently operatively connected to the planetary gearing.

9 Claims, 1 Drawing Sheet

(51) Int. Cl.
*B60K 6/365* (2007.10)
*B60K 6/448* (2007.10)
*B60K 6/52* (2007.10)
*B60K 17/356* (2006.01)
*B60K 6/445* (2007.10)
*B60W 20/15* (2016.01)
*B60W 10/02* (2006.01)
*B60W 10/06* (2006.01)

(52) U.S. Cl.
CPC .............. *B60K 6/52* (2013.01); *B60K 17/356* (2013.01); *B60K 2006/4816* (2013.01); *B60W 10/02* (2013.01); *B60W 10/06* (2013.01); *B60W 20/15* (2016.01); *F16H 2200/2005* (2013.01); *Y02T 10/6239* (2013.01); *Y02T 10/6243* (2013.01); *Y02T 10/6265* (2013.01)

(58) Field of Classification Search
CPC .......... B60K 2006/4816; B60W 10/06; B60W 10/02; B60W 20/15; Y02T 10/6265; Y02T 10/6239; Y02T 10/6243; F16H 2200/2005
See application file for complete search history.

(56) References Cited

U.S. PATENT DOCUMENTS

| | | | | |
|---|---|---|---|---|
| 7,154,236 B1* | 12/2006 | Heap | ...................... | B60K 6/365 318/9 |
| 7,908,063 B2* | 3/2011 | Sah | ....................... | B60K 6/445 701/51 |
| 2007/0145749 A1 | 6/2007 | Holmes et al. | | |
| 2009/0095548 A1 | 4/2009 | Tamba et al. | | |
| 2011/0027105 A1 | 2/2011 | Haupt et al. | | |
| 2012/0015772 A1* | 1/2012 | Kira | ....................... | B60K 6/442 475/149 |
| 2012/0137681 A1* | 6/2012 | Hoess | ...................... | B60K 6/48 60/607 |
| 2012/0221197 A1* | 8/2012 | Hisada | ................. | B60H 1/3222 701/36 |
| 2012/0266701 A1* | 10/2012 | Yamada | ................. | B60K 6/383 74/15.82 |
| 2013/0237360 A1 | 9/2013 | Delucia et al. | | |
| 2013/0324357 A1 | 12/2013 | Stenson | | |
| 2014/0094336 A1* | 4/2014 | Versteyhe | ................ | B60K 6/40 475/8 |
| 2014/0158441 A1* | 6/2014 | Ono | ...................... | B60W 10/08 180/65.25 |
| 2014/0171247 A1 | 6/2014 | Puiu et al. | | |

FOREIGN PATENT DOCUMENTS

| | | |
|---|---|---|
| DE | 102004045932 A1 | 4/2005 |
| DE | 102007023924 A1 | 12/2008 |
| DE | 102011006813 A1 | 12/2011 |
| DE | 102012211403 A1 | 1/2013 |
| DE | 102013001095 A1 | 7/2014 |
| DE | 102013111148 A1 | 4/2015 |
| EP | 0 805 059 A3 | 6/1998 |
| EP | 2655116 A1 | 10/2013 |
| JP | 200278105 A | 3/2002 |

OTHER PUBLICATIONS

International Search Report and Written Opinion dated Feb. 7, 2017 of corresponding Application No. PCT/EP2016/078679; 12 pgs.
International Preliminary Report on Patentability dated Mar. 9, 2018 of corresponding Application No. PCT/EP2016/078679; 29 pgs.
Translation of International Preliminary Report on Patentability dated Jun. 21, 2018 in corresponding International Application No. PCT/EP2016/078679 (6 pages).
Office Action dated Jun. 29, 2020 in corresponding Chinese Application No. 201680072961.0; 9 pages including English-language translation.

* cited by examiner

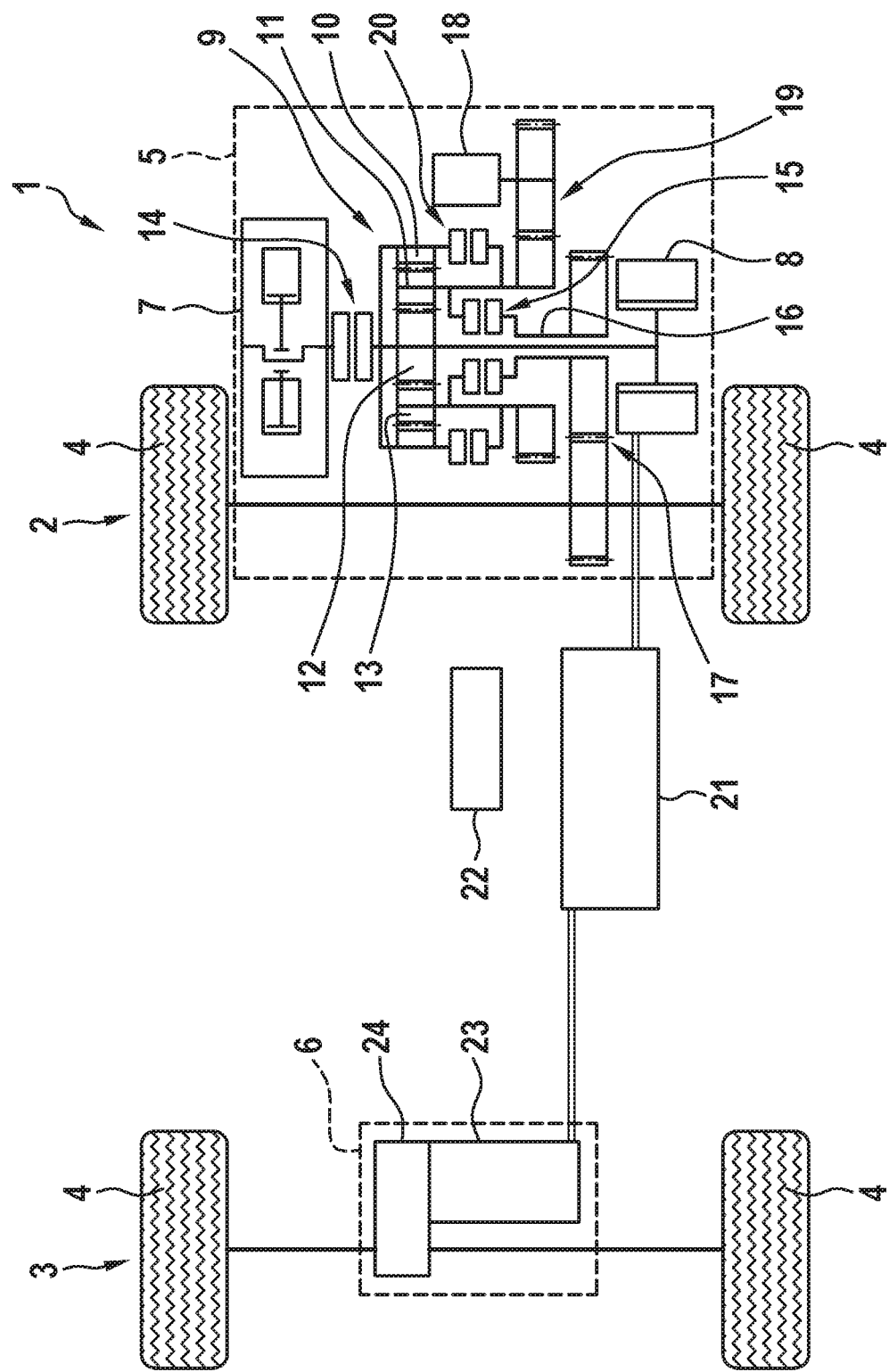

DRIVE DEVICE FOR A MOTOR VEHICLE, CORRESPONDING MOTOR VEHICLE AND METHOD FOR OPERATING A DRIVE DEVICE

FIELD

The invention relates to a drive device for a motor vehicle, comprising a first drive assembly, a second drive assembly, and a planetary gearing, via which the first drive assembly and the second drive assembly can be operatively connected to a drivable axle of the motor vehicle. The invention further relates to a motor vehicle having a drive device and a method for operating a drive device.

BACKGROUND

The drive device serves for driving the motor vehicle and accordingly, therefore, for supplying a torque directed at driving the motor vehicle. The drive device is equipped with the first drive assembly, the second drive assembly, and the planetary gearing. The two drive assemblies can be designed basically as desired. For example, the first drive assembly can be present in the form of an internal combustion engine and the second drive assembly can be present as an electric machine, so that the drive device is designed as a hybrid drive device.

The two drive assemblies, i.e., the first drive assembly and the second drive assembly can be operatively connected to the drivable axle of the motor vehicle via the planetary gearing. This means that the drivable axle of the motor vehicle can be driven either solely by means of the first drive assembly, solely by means of the second drive assembly, or else by means of both the first drive assembly and the second drive assembly. Provided at the drivable axle is at least one wheel of the motor vehicle, which can be driven by means of the drive device.

Preferably, however, a plurality of wheels, each of which can be driven by the drive device, are assigned to the axle.

The object of the invention is to propose a drive device for a motor vehicle that, in comparison to known drive devices, offers advantages and, in particular, has a high energy efficiency as well as a great flexibility.

SUMMARY OF THE DISCLOSURE

This is achieved in accordance with the invention with a drive device having the features of claim 1. In this case, it is provided that the first drive assembly can be operatively connected to the planetary gearing via a first clutch coupling and the drivable axle can be operatively connected to the planetary gearing via a second clutch coupling, and the second drive assembly and an auxiliary assembly are permanently operatively connected to the planetary gearing.

The first clutch coupling and the second clutch coupling can each be present in at least two shifting states, namely, in a first shifting state, in which they are completely opened or disengaged, so that no torque is transmitted by them, and in a second shifting state, in which they are at least partially closed or engaged, in particular completely engaged, so that a torque, in particular, the entire torque applied at the clutch coupling, is transmitted via the respective clutch coupling. Especially preferred, the first clutch coupling and the second clutch coupling are each completely engaged in their second shifting state, so that, in this case, the first drive assembly or the drivable axle is coupled essentially rigidly to the planetary gearing.

In this respect, both the first drive assembly and the drivable axle can be decoupled completely from the planetary gearing, so that the respective operative connection between them and the planetary gearing is severed. Through corresponding adjustment of the clutch couplings, it is therefore possible optionally to produce and to sever the operative connection between the first drive assembly and the planetary gearing, on the one hand, and the operative connection between the drivable axle and the planetary gearing, on the other hand.

In contrast, the second drive assembly and the auxiliary assembly are permanently operatively connected to the planetary gearing. This means that they are coupled rigidly to the planetary gearing and, therefore, in particular, there is no clutch coupling between them and the planetary gearing. The linkage of the second drive assembly and of the auxiliary assembly can be provided directly or indirectly via another gearing, such as, for example, a gear train. Especially preferred, the second drive assembly is operatively connected permanently and directly to the planetary gearing, whereas the auxiliary assembly is operatively connected permanently, albeit only indirectly, to the planetary gearing via the other gearing.

The drive device and the elements associated with it, in particular the first drive assembly, the second drive assembly, the auxiliary assembly, the planetary gearing, the first clutch coupling, and the second clutch coupling, are preferably arranged in a common packing space or even in a common motor housing. In this way, it is possible to create a greater scope of function with a relatively small installation space, because the drive device is very compact. The auxiliary assembly is, for example, a turbomachine, in particular a compressor, and, especially preferred, an air conditioning compressor. For example, the latter serves for air conditioning an interior of the motor vehicle.

The described embodiment of the drive device is especially advantageous in the case that the first drive assembly is designed as an internal combustion engine and the second drive assembly is designed as an electric machine. Thus, a higher drag torque is obtained for the internal combustion engine than for the electric machine. In the ideal case, it may even be assumed that the drag torque of the electric machine is nearly zero. Accordingly, for reasons of energy efficiency of the drive device, it is appropriate to design the internal combustion engine in the form of the first drive assembly so that it can be decoupled from the planetary gearing, for which reason the first clutch coupling is provided. In contrast, the second drive assembly in the form of the electric machine can be permanently operatively connected to the planetary gearing, without this having a detrimental effect on the efficiency.

Through corresponding adjustment of the first clutch coupling, it is then possible to bring about a torque on the planetary gearing solely by the first drive assembly, solely by the second drive assembly, or jointly by both drive assemblies, wherein said torque can be positive or negative. In this case, a positive torque is understood to mean a torque that is directed at an acceleration of at least one element of the planetary gearing and/or of the drivable axle, whereas a negative torque brings about a deceleration, that is, a reduction in rotational speed.

The torque applied to the planetary gearing can then be supplied—for a second clutch coupling that is at least partially engaged—at least in part to the drivable axle. In addition, a part of the torque can be used for driving the auxiliary assembly. In contrast, the second clutch coupling is completely opened, so the operative connection between the planetary gearing and the drivable axle is severed. In this case, it is possible, for example, for the applied torque to serve to drive the auxiliary assembly or to generate electrical energy by means of the second drive assembly designed as an electric machine. In the latter case, the second drive assembly is driven by the first drive assembly via the planetary gearing.

Another embodiment of the invention provides that the first drive assembly is operatively connected to a ring gear of the planetary gearing via the first clutch coupling. The operative connection of the first drive assembly to the ring gear can be present rigidly and directly when the first clutch coupling is engaged. This means that, when the first clutch coupling is engaged, the ring gear of the planetary gearing has the same rotational speed as the first drive assembly.

A preferred enhancement of the invention provides that the drivable axle can be operatively connected to a planetary gear cage of the planetary gearing via the second clutch coupling, wherein, at the planetary gear cage, at least one planetary gear is rotatably mounted, which meshes, on the one hand, with the ring gear and, on the other hand, with a sun gear of the planetary gearing. For example, an intermediate shaft is provided, which is operatively connected rigidly and permanently to the drivable axle via, for example, a gearing or a gear stage.

The intermediate shaft can then be operatively connected to the planetary gear cage of the planetary gearing via the second clutch coupling gear cage, in particular directly and rigidly. Analogously to the above statements, this means that, when the second clutch coupling is engaged, the intermediate shaft has the same rotational speed as the planetary gear cage. Obviously, the drivable axle can also be operatively connected directly, that is without the intermediate shaft, to the planetary gear cage.

The planetary gearing has a conventional design, that is, it is equipped with the ring gear, the planetary gear cage, and the sun gear. The at least one planetary gear is rotatably mounted at the planetary gear cage, with preferably a plurality of planetary gears being mounted at the planetary gear cage. The planetary gear or the planetary gears each mesh, on the one hand, with the ring gear and, on the other hand, with the sun gear.

In the scope of another embodiment of the invention, it can be provided that the second drive assembly is operatively connected to the sun gear of the planetary gearing. The operative connection between the second drive assembly and the sun gear is preferably rigid and direct. This means that the sun gear constantly has the same rotational speed as the second drive assembly or vice versa.

An enhancement of the invention provides that; Added: In accordance with invention, it is provided that the auxiliary assembly is operatively connected to the planetary gear cage. The operative connection between the auxiliary assembly and the planetary gear cage is usually rigid and permanent. Whereas the auxiliary assembly can be operatively connected directly to the planetary gear cage, preferably an indirect operative connection via a gearing or a gear stage will be present. Therefore, the auxiliary assembly is operatively connected rigidly and permanently to the planetary gear cage via said gearing, so that the rotational speed of the auxiliary assembly is always proportional to the rotational speed of the planetary gear cage.

Another preferred embodiment of the invention provides that, by means of a third clutch coupling, the planetary gear cage can be fixed in position with respect to the ring gear. Analogously to the preceding statements for the first clutch coupling and the second clutch coupling, the third clutch coupling can also have at least two shifting states, namely, the first shifting state, in which it is completely disengaged, and the second shifting state, in which it is at least partially engaged and, in particular, completely engaged. Preferably, therefore, when the third clutch coupling is engaged, the planetary gear cage is completely fixed in position with respect to the ring gear, or the planetary gear cage is rigidly coupled to the ring gear.

Finally, in another embodiment of the invention, it can be provided that a third drive assembly is operatively connected to the planetary gearing and, in particular, to the ring gear or to the planetary gear cage. The third drive assembly advantageously is present in the form of an electric machine. Overall, the drive device is thus equipped with the internal combustion engine and two electric machines, each of which is operatively connected or can be operatively connected to the planetary gearing.

Analogously to the second drive assembly, the third drive assembly is advantageously operatively connected rigidly and/or permanently to the planetary gearing, in particular to the ring gear thereof or to the planetary gear cage thereof. If the third drive assembly is provided, then the torque supplied to the planetary gearing can be produced by means of the first drive assembly, the second drive assembly, and the third drive assembly in any desired combination.

The invention further relates to a motor vehicle with a drive device, in particular a drive device in accordance with the preceding statements, wherein the drive device has a first drive assembly, a second drive assembly, and a planetary gearing, by way of which the first drive assembly and the second drive assembly are operatively connected to a drivable axle of the motor vehicle. In this case, it is provided that the first drive assembly is operatively connected to the planetary gearing via a first clutch coupling and the drivable axle is operatively connected to the planetary gearing via a second clutch coupling, and the second drive assembly as well as an auxiliary assembly are permanently operatively connected to the planetary gearing. Added: The invention further relates to a motor vehicle having a drive device in accordance with the preceding statements.

Reference has already been made to the advantages of such an embodiment of the motor vehicle and of the drive device. Both the motor vehicle and the drive device can be further developed in accordance with the preceding statements, so that reference to said statements is made accordingly.

In another embodiment of the invention, it can be provided that an additional drive assembly is operatively connected or can be operatively connected to an additional drivable axle of the motor vehicle. The additional drive assembly is, for example, an electric machine. Said electric machine is coupled or can be coupled to the additional drivable axle, which differs from the above-described drivable axle. The operative connection between the additional drive assembly and the additional drivable axle can be provided directly, so that the additional drivable axle therefore constantly has the same rotational speed as the additional drive assembly. Obviously, however, a gearing can be provided between the additional drive assembly and the additional drivable axle, and hence the operative connection may be present only indirectly.

Finally, the invention relates to a method for operating a drive device, in particular a drive device in accordance with the preceding statements, wherein the drive device has a first drive assembly, a second drive assembly, and a planetary gearing, via which the first drive assembly and the second drive assembly can be operatively connected to a drivable axle of the motor vehicle. In this case, it is provided that; Added: can be operatively connected to a drivable axle of the motor vehicle, wherein the first drive assembly can be operatively connected to the planetary gearing via a first clutch coupling, and the drivable axle can be operatively connected to the planetary gearing via a second clutch coupling, and the second drive assembly and an auxiliary assembly are permanently operatively connected to the planetary gearing, wherein a shifting state of the first clutch coupling and a shifting state of the second clutch coupling are determined on the basis of type of operation of the drive device and are adjusted at the first clutch coupling and at the second clutch coupling.

Reference is made once again to the preceding statements, in accordance with which the drive device and the method can be further developed.

If the drive device has the first drive assembly and the second drive assembly as well as the first clutch coupling, the second clutch coupling, and the third clutch coupling, but not the third drive assembly, then the following types of operation ensue, which are chosen, for example, depending on the state of charge of an energy storage unit:

If the energy storage unit is full or exceeds a specific state of charge, then, for example, the first clutch coupling can be disengaged and the second clutch coupling as well as the third clutch coupling can be engaged. In this case, the first drive assembly is decoupled from the planetary gearing, whereas the second drive assembly is in operative connection with the drivable axle via the planetary gearing. Accordingly, the drivable axle can be driven by means of the second drive assembly. At the same time, the auxiliary assembly is coupled both to the second drive assembly and to the drivable axle, and is therefore driven by them.

Furthermore, there obviously exists the possibility of additionally engaging the first clutch coupling. In this case, the drivable axle is driven both by the first drive assembly and by the second drive assembly. The auxiliary assembly is accordingly additionally operatively connected to the first drive assembly and can be driven by it.

If, in contrast, the energy storage unit is empty or drops below a specific desired state of charge, then the first clutch coupling and the second clutch coupling can be engaged and the third clutch coupling can be disengaged and the second drive assembly can be operated at least intermittently as a generator. In this case, the second drive assembly, the auxiliary assembly, and the drivable axle are driven by the first drive assembly. Through corresponding adjustment of the second drive assembly, the gearing can be operated as a continuously variable gearing, that is, as a so-called CVT (continuously variable transmission). If the third clutch coupling is additionally engaged, so that, therefore, all three clutch couplings are engaged.* In this case, the first drive assembly is employed as a range extender and, in turn, the second drive assembly can be employed for charging the energy storage unit.

If the drive device is additionally equipped with the additional drive assembly, then a large number of possible types of operation ensue, which are listed below in a table. The drivable axle is referred to here as the first axle and the additional drivable axle is referred to as the second axle. For example, the first axle is designed as a front axle and the second axle is designed as a rear axle.

However, the converse embodiment can also be provided. Different types of operation of the drive device are explained on the basis of the rows in the table.

|    |     |                               | AAG |   |   | Clutch |   |   |
| -- | --- | ----------------------------- | --- | - | - | ------ | - | - |
| ES | NA  | Axle                          | 1   | 2 | 3 | 1      | 2 | 3 |
| V  | 1+A | HA: 3                         |     | X |   |        | X | X |
| V  | Aus | VA: 2                         |     |   | X |        | X |   |
| V  | A   | VA: 2                         |     |   | X | X      |   |   |
| V  | 1+2 | HA: 1+2                       | X   | X |   | X      | X | X |
| V  | Aus | HA + VA: 1+2+3 (CVT)          | X   | X | X | X      | X |   |
| V  | Aus | HA + VA: 2+3                  |     | X | X |        | X | X |
| V  | 2+1 | HA + VA: 1+2+3                | X   | X | X | X      | X | X |
| V  | Aus | HA + VA: 1+2+3                | X   | X | X | X      | X | X |
| L  | 1   | HA: 1+2 (range extender)      | X   | G |   | X      | X | X |
| L  | 1   | HA: 1+2 (CVT)                 | X   | G |   | X      | X |   |
| L  | Aus | VA: 3 (range extender)        | R   | G | X | X      |   | X |
| L  | 1   | HA + VA: 1+2+3 (range extender) | X | G | X | X      | X | X |
| L  | Aus | HA + VA: 1+2+3 (range extender) | X | G | X | X      | X | X |

In the table, "ES" stands for energy storage unit, the instantaneous state of charge of which, in accordance with the corresponding column, is greater than the desired state of charge ("V"; full) or smaller than the desired state of charge ("L"; empty). The expression "NA" stands for the auxiliary assembly, wherein the column indicates what drives the auxiliary assembly. Numbers stand for the respective drive assembly, that is, "1" for the first drive assembly and "2" for the second drive assembly; the letter "A" indicates that the auxiliary assembly is driven by the axle of the motor vehicle or at least is in operative connection with it. "Aus" means that the auxiliary assembly is deactivated.

The column "Axle" indicates which axles are driven and how this occurs. "HA" hereby stands for the rear axle—for example, the drivable axle—and "VA" stands for the front axle—for example, the additional drivable axle. The numbers indicate, in turn, the drive assembly that serves for driving the corresponding axle or the corresponding axles. In addition, "3" stands for the additional drive assembly—for example, the additional electric machine. In addition, a type of operation is given in part in parentheses in the column. The expression "CVT" stands for the operation of the planetary gearing as a continuously variable transmission, while "range extender" means that the first drive assembly is used partially or completely for driving the second drive assembly in order to generate electric energy.

The column headed "AAG" indicates which drive assembly is operated. Once again, the numbers stand for the corresponding drive assembly. "X" means an operation of the drive assembly involving the driving of at least one of the axles, "G" means a purely generator operation, and "R" means the use of the first drive assembly solely as a range extender, that is, for the generation of electric energy, but not for directly driving one of the axles. An empty box means that the drive assembly is deactivated, that is, is not operated. The column "Clutch" indicates which of the clutch couplings are engaged ("X") and which are disengaged (empty box). Here, "1" stands for the first clutch coupling, "2" stands for the second clutch coupling, and "3" stands for the third clutch coupling.

BRIEF DESCRIPTION OF THE DRAWINGS

The invention will be explained in detail below on the basis of the exemplary embodiments illustrated in the drawing, without any limitation of the invention thereby ensuing. Shown in the sole FIGURE herein is:

FIGURE a schematic illustration of a motor vehicle having a drive device.

DETAILED DESCRIPTION

The FIGURE shows a schematic illustration of a motor vehicle 1 with two axles 2 and 3, wherein a plurality of wheels 4 are associated with each of the axles 2 and 3. Both axles 2 and 3 are designed as drivable axles. For this purpose, a drive device 5 is associated with the axle 2, while an additional drive device 6 is provided at the second axle 3. The drive device 5 is equipped with a first drive assembly 7, a second drive assembly 8, and a planetary gearing 9. Via the planetary gearing 9, the drive assemblies 7 and 8 can be operatively connected to the axle 2 and accordingly to the wheels 4 thereof.

The planetary gearing 9 has a ring gear 10, a planetary gear cage 11, and a sun gear 12. Rotatably mounted at the planetary gear cage 11 is at least one planetary gear 13, which, on the one hand, meshes with the ring gear 10 and, on the other hand, meshes with the sun gear 12. Via a first clutch coupling 14, the ring gear 10 can be operatively connected to the first drive assembly 7. In this case, the first clutch coupling 14 can have at least two shifting states, namely, a first shifting state, in which it is completely disengaged and therefore does not transmit any torque, and a second shifting state, in which it is partially engaged and, in particular, is completely engaged, so that a torque is transmitted between the first drive assembly 7 and the planetary gearing 9 and, in particular, the ring gear 10.

In addition to the first clutch coupling 14, a second clutch coupling 15 is provided, via which the planetary gearing 9 and, in particular, the planetary gear cage 11, can be operatively connected to the axle 2. In particular, by means of the second clutch coupling 15, an operative connection between the planetary gear cage 11 and an intermediate shaft 16 is optionally produced or severed. The intermediate shaft 16, in turn, is operatively connected rigidly and permanently to the axle 2 or to the wheels 4 thereof via, for example, a gear stage 17. Finally, the second drive assembly 8 is operatively connected rigidly and permanently to the sun gear 12.

Furthermore, the drive device 5 has an auxiliary assembly 18. Said auxiliary assembly is preferably operatively connected rigidly and permanently to the planetary gear cage 11. Said operative connection may be present directly, so that, therefore, the auxiliary assembly 18 constantly has the same rotational speed as the planetary gear cage 11. Preferably, however, the operative connection is present via a gear stage 19, so that, between the planetary gear cage 11 and the auxiliary assembly 18, a specific rotational speed ratio is adjusted. Furthermore, a third clutch coupling 20 is provided, by means of which the planetary gear cage 11 can be fixed in position with respect to the ring gear 10.

The second drive assembly 8 is electrically connected to an energy storage unit 21 for intervening storage of electrical energy. The energy storage unit 21 is preferably designed as a high-voltage energy storage unit, wherein the electric voltage of the energy storage unit 21 is preferably greater than that of an on-board energy storage unit 22, which can be provided for additionally supplying other components of the motor vehicle 1 with electrical energy. In addition, at the energy storage unit 21, an additional drive assembly 23 of the additional drive device 6 is electrically connected. The drive assembly 23 can be operatively connected directly or indirectly to the second axle 3 or to the wheels 4 thereof via a gearing 24. By use of the drive assembly 23, it is possible in this case to drive the axle 3 or its wheels 4.

Obviously, the embodiment of the motor vehicle 1 illustrated here is to be understood as being purely by way of example. Thus, for example, the drive device 5 can be associated with the axle 3 and, conversely, the drive device 6 can be associated with the axle 2. In another embodiment, the drive device 6 or the drive assembly 23, together with the gearing 24, can be dispensed with. In this case, it is especially advantageously provided that the drive device 5 is associated with a third drive assembly, which, for example, is present as an additional electric machine. The third drive assembly can be operatively connected to the planetary gearing 9 and, in particular, to the ring gear 10 or to the planetary gear cage 11. In this case, the operative connection is preferably rigid and permanent in design.

Such an embodiment of the motor vehicle 1 or of the drive device 5 makes possible the realization of a more extensive functionality with, at the same time, a very small packing space. This is achieved, in particular, by the association of the auxiliary assembly 18 with the drive device 5 and the linkage thereof to the planetary gearing 9. Obviously, in addition to the auxiliary assembly 18 described here, at least one additional auxiliary assembly can be present, which, is likewise operatively connected rigidly and permanently to the planetary gearing and, in particular, is likewise operatively connected to the planetary gear cage 11. This can be provided via an additional gear stage, which can have the same gear ratio as the gear stage 19 or else a gear ratio that differs from said gear ratio.

The auxiliary assembly 18 advantageously is present as a turbomachine, such as, for example, a Primakompressor of an air conditioning system for the interior of the motor vehicle 1. The additional auxiliary assembly can likewise be present as a turbomachine, such as, for example as a vacuum pump for a brake booster.

In order to further improve the efficiency of the drive device 5, it is possible additionally to provide a heat-storage unit, in which heat produced by the first drive assembly 7 and/or by the second drive assembly 8 can undergo intermediate storage. Said intermediate storage of heat can be employed, for example, for a faster heating of the drive assembly 7 during a cold start following parking of the motor vehicle 1, so that said motor vehicle reaches its operating temperature more rapidly. The heat that undergoes intermediate storage in the heat-storage unit, in addition, can be used for climate control of the vehicle interior. The heat-storage unit can fundamentally be designed in this case in any desired way. Especially preferred, it is present as a latent heat storage unit and therefore comprises a phase-change material.

The invention claimed is:

1. A drive device for a motor vehicle comprising:
   a first drive assembly;
   a second drive assembly; and
   a drivable axle of the motor vehicle to which the first drive assembly and the second drive assembly are operatively connected via a planetary gearing, wherein the first drive assembly can be operatively connected to the planetary gearing via a first clutch coupling, the drivable axle can be operatively connected to the planetary gearing via a second clutch coupling, and the second drive assembly and an auxiliary assembly are permanently operatively connected to the planetary gearing,
   wherein the auxiliary assembly consists of at least one of: a turbomachine, a compressor, an air-conditioning compressor, and a vacuum pump,
   wherein the first drive assembly is selectively coupled to a ring gear of the planetary gearing via the first clutch coupling.

2. The drive device according to claim 1, wherein the drivable axle can be operatively connected to a planetary gear cage of the planetary gearing via the second clutch coupling, wherein at the planetary gear cage, at least one planetary gear is rotatably mounted and meshes, on the one hand, with a ring gear of the planetary gearing and, on the other hand, with a sun gear of the planetary gearing.

3. The drive device according to claim 1, wherein the second drive assembly is operatively connected to a sun gear of the planetary gearing.

4. The drive device according to claim 1, wherein the auxiliary assembly is operatively connected to a planetary gear cage of the planetary gearing.

5. The drive device according to claim 1, wherein, by means of a third clutch coupling, a planetary gear cage of the planetary gearing can be rotatably fixed relative to a ring gear of the planetary gearing.

6. The drive device according to claim 1, wherein a third drive assembly is operatively connected to the planetary gearing, in particular to a ring gear of the planetary gearing or to a planetary gear cage of the planetary gearing.

7. A motor vehicle having a first drive device, wherein the first drive device comprises:
a first drive assembly;
a second drive assembly; and
a first drivable axle of the motor vehicle to which the first drive assembly and the second drive assembly are operatively connected via a planetary gearing, wherein the first drive assembly can be operatively connected to the planetary gearing via a first clutch coupling, the first drivable axle can be operatively connected to the planetary gearing via a second clutch coupling, and the second drive assembly and an auxiliary assembly are permanently operatively connected to the planetary gearing,
wherein the auxiliary assembly consists of at least one of: a turbomachine, a compressor, an air-conditioning compressor, and a vacuum pump,
wherein the first drive assembly is selectively coupled to a ring gear of the planetary gearing via the first clutch coupling.

8. The motor vehicle according to claim 7, further comprising a second drive device operatively connected to a second drivable axle.

9. A method for operating a drive device of a motor vehicle comprising:
operatively connecting a first drive assembly to a planetary gearing via a first clutch coupling;
operatively connecting a drivable axle to the planetary gearing via a second clutch coupling;
operatively and permanently connecting a second drive assembly and an auxiliary assembly to the planetary gearing; and
toggling a shifting state of the first clutch coupling and the second clutch coupling on the basis of an operation state of the motor vehicle,
wherein the auxiliary assembly consists of at least one of: a turbomachine, a compressor, an air-conditioning compressor, and a vacuum pump,
wherein the first drive assembly is selectively coupled to a ring gear of the planetary gearing via the first clutch coupling.

* * * * *